(12) United States Patent
Dimitrov et al.

(10) Patent No.: US 10,037,155 B2
(45) Date of Patent: Jul. 31, 2018

(54) PREVENTING WRITE AMPLIFICATION DURING FREQUENT DATA UPDATES

(71) Applicant: LinkedIn Corporation, Mountain View, CA (US)

(72) Inventors: Ivaylo G. Dimitrov, Mountain View, CA (US); Davi Einstein Melges Arnaut, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 15/224,193

(22) Filed: Jul. 29, 2016

(65) Prior Publication Data

US 2018/0032270 A1   Feb. 1, 2018

(51) Int. Cl.
*G06F 3/06* (2006.01)
*G06F 17/30* (2006.01)

(52) U.S. Cl.
CPC .......... *G06F 3/0619* (2013.01); *G06F 3/0659* (2013.01); *G06F 3/0673* (2013.01); *G06F 17/30318* (2013.01); *G06F 17/30345* (2013.01)

(58) Field of Classification Search
CPC .... G06F 3/0619; G06F 3/0659; G06F 3/0673; G06F 17/30011; G06F 17/30309; G06F 17/30318
USPC .......................................................... 711/154
See application file for complete search history.

(56) References Cited

U.S. PATENT DOCUMENTS

2016/0078025 A1*   3/2016   Fume ................ G06F 17/30864
                                                                707/722

* cited by examiner

*Primary Examiner* — Jasmine Song
(74) *Attorney, Agent, or Firm* — Park, Vaughan, Fleming & Dowler LLP

(57) ABSTRACT

A system, method, and apparatus are provided for limiting or preventing write amplification. Full documents (which may be stored as blobs) are stored as monolithic entities in that only the entire documents can be written or read. When one or more fields or other portions of a document are determined to be "hot," those fields are stored in a separate structure, possibly adjacent to the document. When only these fields are updated, the document need not be rewritten. For read requests, both structures are read and merged to yield a true version of the document. Fields may be considered hot based on criteria such as frequency of access, ratio of the fields' size to the size of the document, type of document, the application associated with the document, etc.

20 Claims, 4 Drawing Sheets

US 10,037,155 B2

PREVENTING WRITE AMPLIFICATION DURING FREQUENT DATA UPDATES

BACKGROUND

This disclosure relates to the field of computer systems and data storage. More particularly, a system, method, and apparatus are provided for preventing write amplification.

Write amplification occurs when a relatively large collection of data, such as an entire document or a full data record, must be written when only a small portion of the data has been updated. For example, in some data storage schemes, when content of a data record is changed the entire record may have to be rewritten to capture the change. The greater the ratio between the amount of data that must be written and the amount of data that actually changed, the more severe the write amplification.

DETAILED DESCRIPTION

Figure 1:
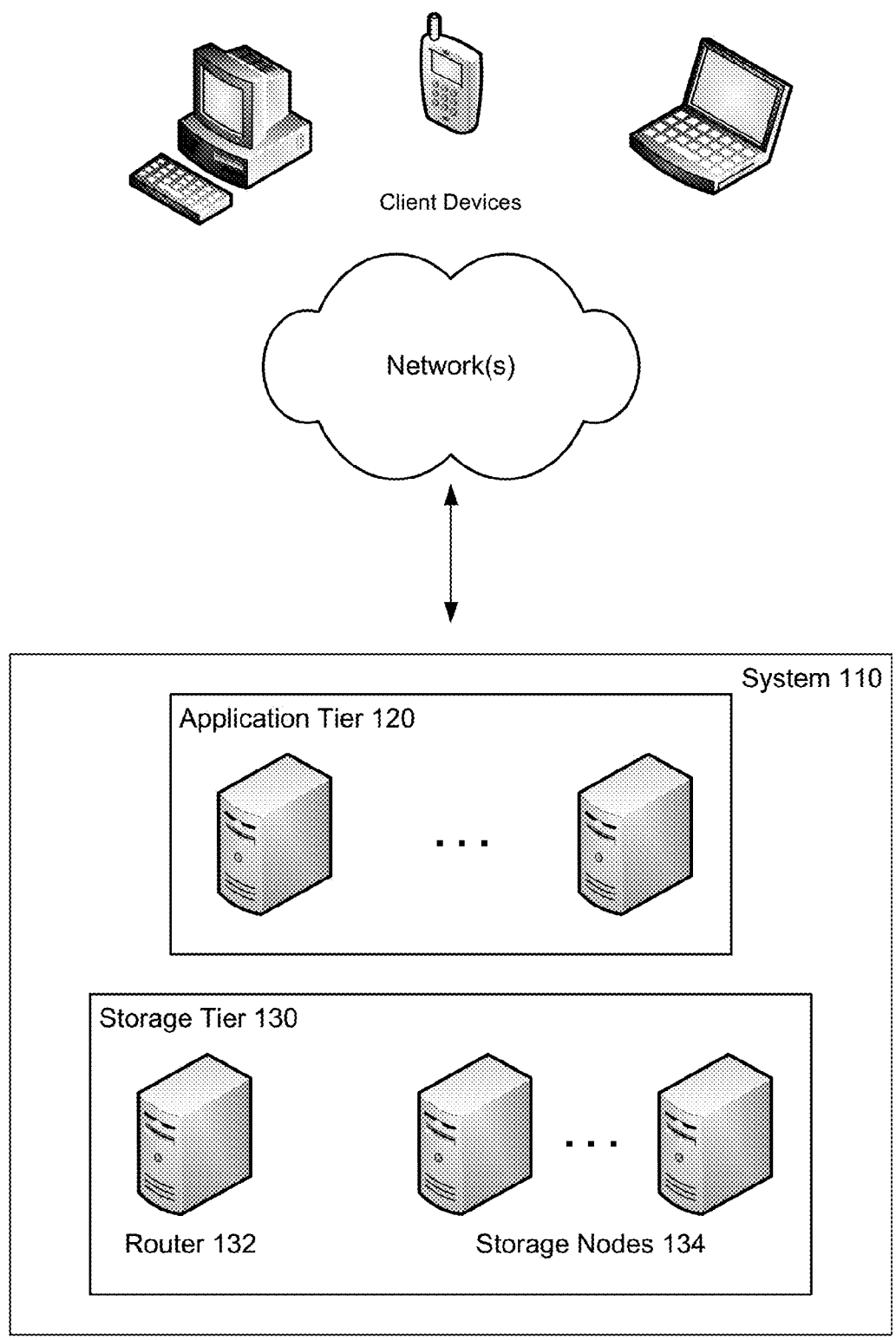
FIG. 1 is a block diagram depicting a computing environment in which write amplification is limited or prevented, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system, method, and apparatus are provided for limiting or preventing write amplification. In these embodiments, when a relatively small portion of a larger data collection is updated regularly, updates to that portion are stored in a separate data structure instead of writing or rewriting the entire data collection. Retrieval of the data collection (e.g., in response to a query or read request) may involve reading both the data collection and the separate structure, and may include merging the updates into the data collection.

The separate structure may reside on the same storage device as the data collection and may even be adjacent to the data collection to make retrieval of both entities very efficient. The portion of the data collection stored in the separate structure may be predetermined or may be determined dynamically. For example, when the data collection is of a particular type or corresponds to a particular application, certain fields or portions of the collection may be determined to be "hot" (i.e., frequently updated), and when a new data collection of that type or for that application is created, the corresponding portions or fields may be stored in the separate structure. As another example, access patterns to the data collection may be observed over time; if a relatively small portion (e.g., less than 50%) is updated relatively frequently (e.g., with a frequency per unit time that is greater than a threshold), that portion may be stored in the separate structure.

In some embodiments, the data collection is a document that is created and maintained by a particular application. Different applications may employ different formats for their documents, and so different portions of different documents may be deemed hot and be selected for storage in separate structures associated with the documents. Although the term 'document' is used herein to refer to data collections for which 'hot' portions may be stored in a separate associated structure, it is to be understood that virtually any type of data collection may be involved. For example, any binary large object (blob) may be considered a document for purposes of the following discussion.

Documents discussed herein differ from data managed by traditional databases (e.g., relational database management systems), because in a traditional database separate fields of a record and separate records in a table can be updated independently, without having to rewrite the entire record or table. In contrast, without the separate structure provided herein, a document would have to be rewritten in its entirety even when only a small percentage of it is updated.

In some embodiments, portions of documents (and/or other data collections) stored in the separate structure may be removed or ejected from the structure when they are no longer sufficiently "hot" and/or when the structure is filled to some capacity and space must be created for new hot data portions.

FIG. 1 is a block diagram depicting a computing environment in which write amplification is limited or prevented, according to some embodiments.

The computing environment of FIG. 1 includes system 110, which may be accessed by client devices via one or more networks, which may include local-area networks, wide-area networks, the Internet, and/or other communication links that employ any suitable communication protocols to exchange information with the system on behalf of the clients. The client devices may include portable and/or stationary computing and/or communication devices, such as laptop computers, notebooks, desktop computers, smartphones, tablets, and so on.

System 110 may be part of or may encompass a data center (or a portion of a data center) dedicated to operation of a professional network, a social network, or some other online application or service characterized by a high volume of data events involving documents (and/or other data) stored within the system.

Events handled within the environment may depend upon the application or service hosted or supported by system 110. Thus, for a professional network or a social network, the events may include actions concerning a content item or another event, such as sharing it, posting it, liking it, commenting on it, tagging it, mentioning a member or user, etc. Content items may include articles, video clips, photographs, posts, comments, job postings, etc. In the environment of FIG. 1, the events are initiated by members (or users) of the professional network or social network and/or by components of the network, possibly including components not shown in the figure. At least some of the content is stored in system 110 and is created and/or modified as part of or in response to related events.

In the illustrated embodiments, system 110 includes application tier 120 and storage tier 130. Other components of the system are omitted for clarity, such as front-end servers, portals, firewalls, and/or other entities that facilitate or support communications between system 110 and the client devices and/or between components of system 110.

Application tier 120 includes one or more application servers that host applications and/or services accessed and used by operators of the client devices. For example, when system 110 supports a professional network or social network, application tier 120 may execute logic that serves profiles of members (or users) of the service, serves content items to members (e.g., via content feeds), tracks members' interactions with content and with each other, helps members make connections with and interact with other members, etc. Although the discussion that follows reflects the use of system 110 to support a professional network, in other environments the system supports some other application or service.

Of note, different applications or services within application tier 120 are associated with documents (or other data collections) having different formats, schemas, or structures. For example, one application may maintain member profiles that features portions or fields such as skills, endorsements, education, and so on, while another application tracks impressions of some or all content items and may include portions or fields such as content item identifier, number of impressions, number of clicks, etc. Document formats may be expressed using AVRO, JSON, XML, and/or some other language or framework.

Storage tier 130 includes multiple storage nodes 134 and one or more routers or other controllers 132. Within system 110, documents are generated and updated by applications executing on nodes (e.g., application servers) within application tier 120, and are stored on storage nodes 134 of storage tier 130. Router 132 may determine an initial storage location for each new document, direct retrieval (e.g., read) requests to the appropriate nodes, and/or take other action.

In other embodiments, application logic and storage logic may be combined in a single entity. For example, a single computing machine or server might execute application logic and also store documents used by the application, as part of system 110 or as a separate system or apparatus.

Figure 2A:
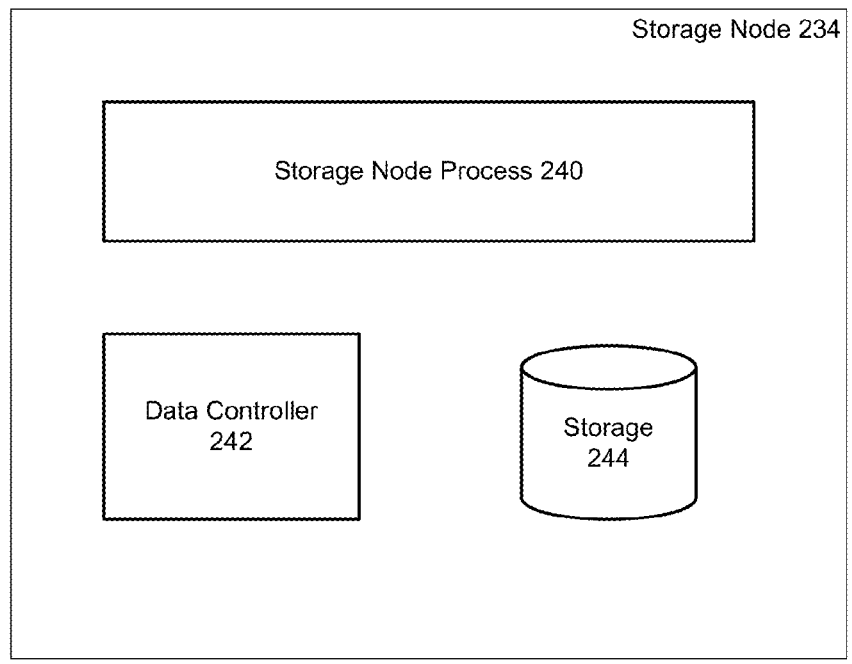
FIGS. 2A-B depict a storage node, and an illustrative document and associated extract stored on the storage node, in accordance with some embodiments.
Figure 2B:
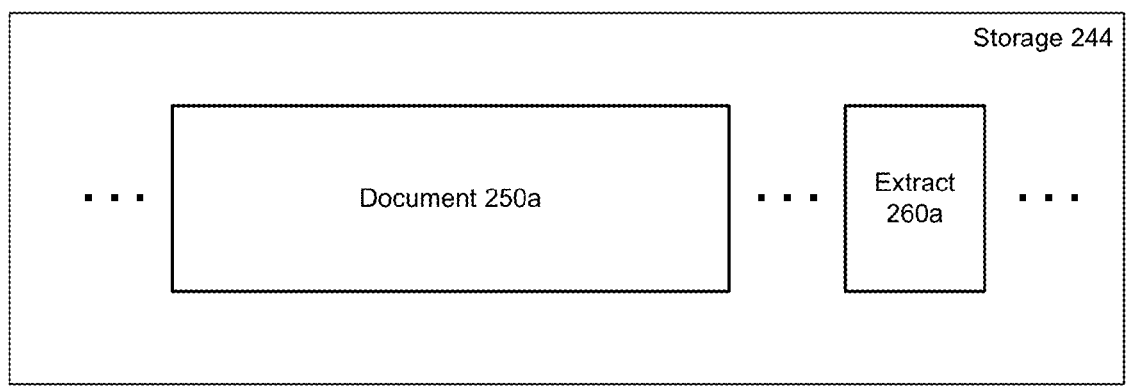

FIGS. 2A-B depict a storage node, and an illustrative document and associated extract stored on the storage node, according to some embodiments. Storage node 234 may be one of storage nodes 134 of system 110 of FIG. 1, and therefore may be just one of multiple similarly (or identically) configured storage nodes.

Storage node 234 executes storage node process 240 and controller 242, and includes one or more storage devices 244, which may include solid-state drives (SSDs), magnetic disks, optical disks, and/or other devices. The storage node may include other components omitted for the sake of clarity, such as one or more processors (for executing storage node process 240 and controller 242), memory (which may store process 240 and controller 242 for execution by the processor(s)), one or more communication interfaces, input components and/or output components, etc.

In some embodiments, storage node process 240 interfaces with a storage tier router or application logic (e.g., of application tier 120 of system 110 of FIG. 1) to receive read and write requests on behalf of particular applications, services, utilities, and/or other logic. It may communicate with the application using REST (Representational State Transfer) and/or other communication protocols. The storage node process is configured to understand at least part of the structures or schemas of the different types of documents used by different applications. Therefore, process 240 is able to determine which portion or portions of a given document has changed when it receives an updated version of the document from the application logic, and can extract those portions. Illustratively, a write request may include only the data fields/portions that were updated, and so the process may simply assume that all data it receives with a write request (e.g., even the entire document) should be written.

Data controller 242 mediates access to the storage device(s) of the storage node and therefore is responsible for the physical storage and retrieval of data to/from storage 244. In some implementations, data controller 242 is a MySQL process, although other types of controllers may be used in other implementations.

Although documents stored in storage 244 may be monolithic entities that are read or written in their entirety, storage node process 240 is able to identify and access individual fields or other portions of documents received for storage and/or read from storage 244. As one consequence, when the storage node process receives an updated version of a document it is able to extract some or all updated fields and store them separately, without rewriting the entire document.

FIG. 2B illustrates a portion of storage device 244. In particular, storage 244 includes document 250a and associated extract 260a. As already discussed, extract 260a is configured to store one or more fields or portions of document 250a—in particular, fields of document 250a that have been designated "hot." In some implementations, extract 260a is adjacent to document 250a; in other implementations, it is offset from the document. In yet other implementations it may be stored on a different storage device.

Document 250a and/or extract 260a may be fixed in size or may be of variable size, possibly depending on the application associated with the document. In some implementations, extract 260a may expand in size as additional portions of document 250a are deemed hot and added to the extract. Similarly, in some implementations a field may be expelled from extract 260a and the extract may contract in size.

In some embodiments, JSON (JavaScript Object Notation) is used to specify the format of extract structure 260a. For example, the hot fields/portions of document 250a that are stored in extract 260a may be expressed in terms of key/value pairs, wherein the key identifies a field (or other portion) of the document and the value is the value of that field. In some other embodiments, some other language or framework may be used to configure extract 260a, such as the same language or format used to describe document 250a.

Because extract 260a resides in secondary storage, it is very different from a cache, and primarily serves a different purpose. The entirety of document 250a still must be read in response to a request for the document; therefore, extract 260a (unlike a cache) does not always provide faster access to requested data. Instead, the extract makes it easier and faster to store some updates to the document. Further, the extract is durable and will survive a system crash and/or other events that might cause data in a cache to be lost.

In some embodiments, a number of hot fields (or other document portions) are identified for a particular type of document (e.g., a member profile, a tracking record of actions on a specified content item) and it may be assumed that those fields will (or may) be frequently updated for some or all new documents of that type. For example, historical access to documents of that type may be analyzed to identify the fields or portions that were updated most frequently during the historical time period. Also, or instead, a field or portion may be dynamically determined to be hot based on current or ongoing observations of access to documents of that type.

In some other embodiments, one or more hot fields are identified for specific documents instead of, or in addition to, identifying a set of hot fields common to some or all documents of a particular type. In these implementations, when updates to a particular field of a particular document exceed some threshold, that field may be designated hot.

In different embodiments and in different computing environments, different criteria or thresholds may be applied to designate a particular pattern or frequency of access as being "hot." Illustrative criteria that may affect such a decision may include (but are not limited to) the size of the document, the size of the field or fields that are candidates for the "hot" designation, the ratio between the size of the candidate field(s) and the size of the encompassing document, the frequency of updates to the field(s) (e.g., per second, per minute), the processing power of the storage node on which the document is stored (e.g., its capacity to apply document updates), how frequently other fields of the document that are not candidates are updated, etc.

As an example of a document (type) and a corresponding extract, consider the following schema:

```
{
    "doc": "Aggregates social activity statistics
    for urls",
    "fields": [
        {
            "name": "resolvedURL",
            "type": "string"
        },
        {
            "name": "articleId",
            "type": "long"
        },
        {
            "name": "commentCount",
            "type": "long"
        },
        {
            "name": "likeCount",
            "type": "long"
        },
        {
            "name": "shareCount",
            "type": "long"
        },
        {
            "name": "readCount",
            "type": "long"
        },
    ],
    "name": "statistics_activity_count",
    "schemaType": "DocumentSchema",
    "type": "record",
    "version": 1,
}
```

The resolvedURL field represents the location of a particular resource (e.g., document, article, blog post). Other fields capture users' interactions with the content identified by the resolvedURL field. The 'count' fields (e.g., readCount, shareCount) for a content item are smaller in size than the URL of the item, and may experience frequent updates, particularly for popular content items. Therefore, the 'count' fields are good candidates for storing in an extract structure.

As another example, consider a table that stores electronic mail and/or other messages (e.g., a Messages table). Each document or content item (i.e., a message) may include some lengthy fields, such as the body of the message, a subject, and an identity of the sender. Each content item would also store some very small fields, such as Boolean values indicating whether the item has been read (e.g., isUnread), whether it has been marked as trash (e.g., isTrash), a timestamp, etc. When the message's metadata is updated (e.g., to indicate that it has been read or marked as trash), having the corresponding fields in an extract structure means that only a few bytes need to be stored instead of a few kilobytes (or more).

As yet another example, consider profiles in a professional network, social network, or other online application or service that features a user community. A given user profile may include lengthy elements, such as a personal description, a list of patents or publications by the user, and so on, as well as short elements, such as a telephone number (e.g., contactInstructions), a timestamp of the last modification to the profile (e.g., lastModified), etc. Frequently updated elements of the profile may amount to, say, less than 10% of the overall size/length of the profile and therefore be good candidates for storage in an extract structure separate from the profile.

Although FIG. 1 and FIGS. 2A-B may depict only a single copy or unit of a particular entity, in other embodiments multiple units may be deployed. For example, contents of a given storage node may be replicated across one or more other storage nodes, a storage node may include multiple storage devices (e.g., for fault tolerance and/or increased storage capacity), etc.

Figure 3:
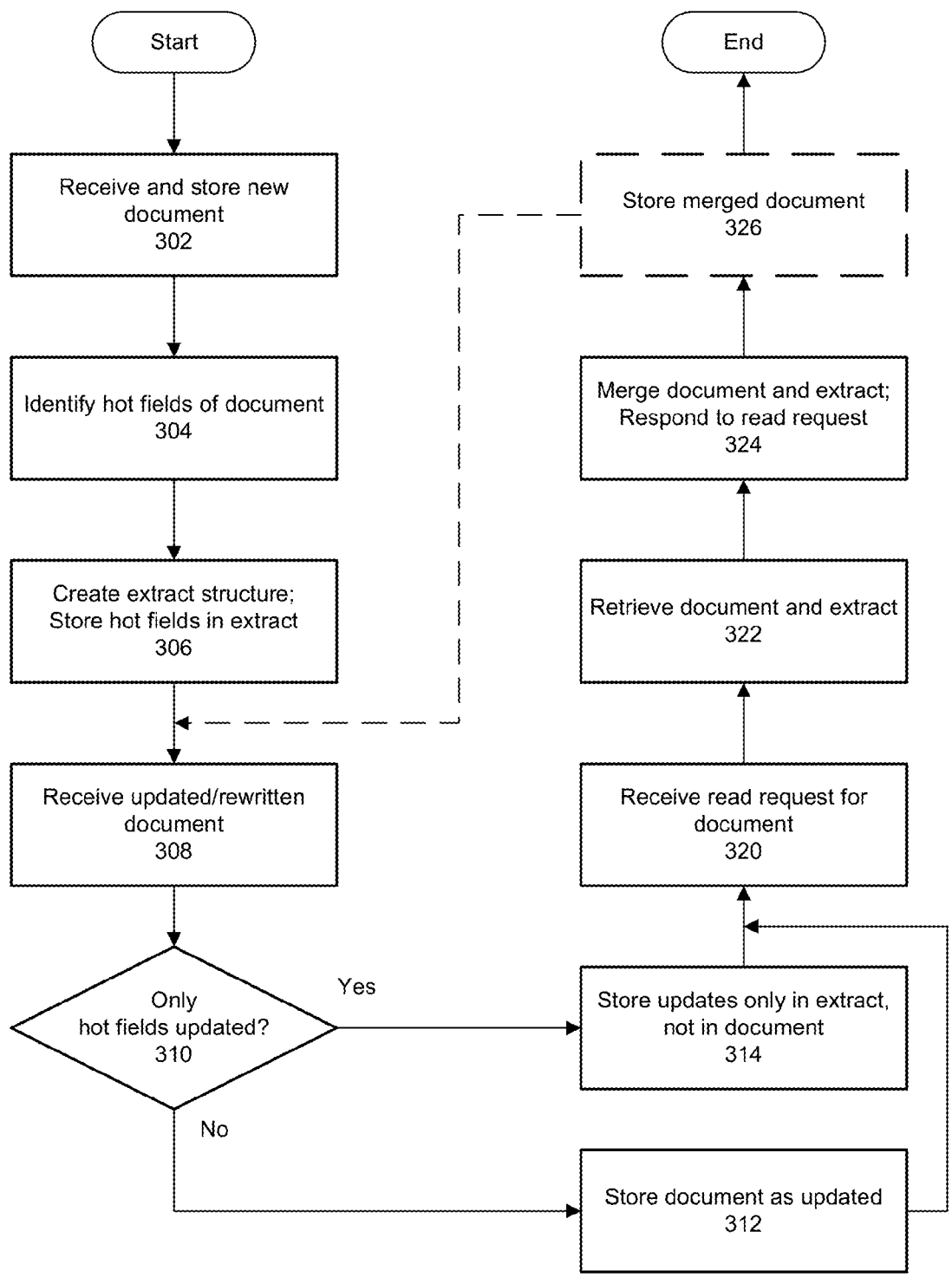
FIG. 3 is a flow chart illustrating a method of limiting or preventing write amplification, in accordance with some embodiments.

FIG. 3 is a flow chart illustrating a method of limiting or preventing write amplification, according to some embodiments.

In operation 302, a new document is received at one storage node within a distributed data storage system comprising multiple nodes, and is stored. The document is associated with one or more applications that generate and modify documents of its particular type and/or structure.

In the illustrated embodiment, the document is stored as a binary large object (blob) and its contents may be text, audio, images, and/or video, depending on the application (or applications) associated with the document. The document is preferably stored as a contiguous entity. A separate structure (e.g., extract 260a of FIG. 2B) may be instantiated at the same time (e.g., with a size that is a particular fraction of the size of the document, or of a predetermined size), or may be created later. To facilitate efficient retrieval of the extract structure with the document (e.g., in response to a read request), for example, the structure may be created immediately before or after the document within the storage device to which the document is allocated.

In operation 304, one or more fields (or other portions) of the document are deemed hot. This designation may occur by default based on the type of document and/or may occur over time as a pattern of access to the document (or documents of the same type) is observed. Thus, in different environments or embodiments, this operation may occur before the new document is created or stored, and/or any time after the document is stored.

In operation 306, if the separate extract structure was not created at the time the document was stored, it is created now, and the hot fields are stored in the extract. Illustratively, storage of the hot fields in the extract may occur as part of a write operation any time after the fields are designated hot, or may be stored as soon as the designation is made. For example, after a set of fields is designated hot, they may be stored in the extract structure the next time one or more of them are updated.

In operation 308, an updated or rewritten version of the document is received at the storage node. For example, after the document is delivered to application logic in response to a read request, one or more fields may be updated and the document may be returned to the storage node.

In operation 310, the storage node determines whether only hot fields were updated. In the illustrated embodiment, the storage node (e.g., storage node process 240 of storage node 234 of FIG. 2A) is configured to understand at least some of the structure or format of the document's type. Therefore, the storage node can perform a difference operation to compare the updated version of the document with the version that was last written in its entirety on a storage device of the storage node. Alternatively, the storage node may receive only the updated portions of the document, in which case this determination may be easier and the storage node may simply write the updated version over the old version.

If one or more fields of the document were updated that are not hot and that are not stored in the separate extract structure, and assuming that those fields are not now designated as hot (in which case they would be added to the extract), the method continues at operation 312. Otherwise, if only hot fields were updated, the method advances to operation 314.

In operation 312, the document is stored. More particularly, the entire document may be read, its structure parsed, and those parts of the document that were provided in the rewritten version can be used to overwrite the corresponding parts of the full document; then the full document is stored. Thus, the contents of the extract are now obsolete until an update of just one or more hot fields of the document is received and stored in the extract. In some implementations, some action may be taken to indicate which data is more recent (i.e., the document or the extract). For example, when the entire document is written (in which case the extract is now obsolete), the extract may be cleared, flags associated with the document and/or extract may be cleared (or set), the extract may also be overwritten (with the new content of the hot portion(s) of the document), timestamps may be implemented, etc. The method continues at operation 320.

In operation 314, the extract structure is written to store the updated field(s) of the document. Illustratively, each data structure written to the storage device (e.g., documents, extracts) can only be written as a whole entity, and so the entire extract is written (or rewritten). Therefore, all document fields that are designated hot may be copied from the updated document and used to rewrite the extract structure, even those that have not changed. The stored document is not altered or written. Thus, the magnitude of the data write operation to the storage node's storage device is reduced according to the ratio of the size of the entire document to the size of the extract. In some alternative embodiments, only the updated elements are written to the extract (e.g., each one may correspond to a separate field/value pair within the extract).

In operation 320, sometime later a read request is received that targets the document. This may occur after any number of updates to the extract have been applied.

In operation 322, the storage node retrieves both the document and the document extract from the storage device, possibly in a single read operation.

In operation 324, the storage node merges the contents of the extract structure into the document, by identifying each element (e.g., field) of the extract and using its value to overwrite the corresponding element in the document. The merged document is then returned in response to the read request.

In some implementations, an extract structure may be merged with its document independent of any read request for the document. For example, a background process may operate to periodically merge extract structures with their associated documents (e.g., during periods of relatively light system activity).

In optional operation 326, the storage node may store the merged document in place of the document in order to consolidate the document's content and cause the stored version to match what was last served to the application logic.

After operation 324 (or operation 326), the illustrated method may end or may return to another operation. For example, if the application logic further updates the document, the method may return to operation 308.

In some alternative embodiments, in response to a read request (e.g., in operation 324) instead of performing the document/extract merger, the storage node may return both the document and the extract, if the application logic (or other originator of the read request) is programmed to use both. Further, if only hot fields are subsequently updated, the application logic may return to the storage node, for storage, just the updated extract and not the entire document. If some portion of the document other than the hot field(s) is updated, the application logic may return just the document. In either case, the storage node need not determine how to handle the update, and can just store what it receives—the extract or the document.

In some embodiments, instead of or in addition to storing frequently updated document fields/portions, an extract structure may store documents fields/portions that are frequent search subjects. For example, if a frequently conducted search targets documents having particular values for one or more fields, those fields may be stored in extracts associated with the documents. As a result, instead of having to read entire documents in order to determine if they match the search criteria, only the extracts need to be read. Documents may still have to be retrieved for extracts that satisfy the search, but this will typically be more than offset by not having to read entire documents that do not satisfy the search.

Thus, in some implementations, separate extracts may be used for (a) storing document fields that are frequently updated and (b) storing document fields that are frequently searched. In other implementations, both types of fields may be stored in a single extract.

Figure 4:
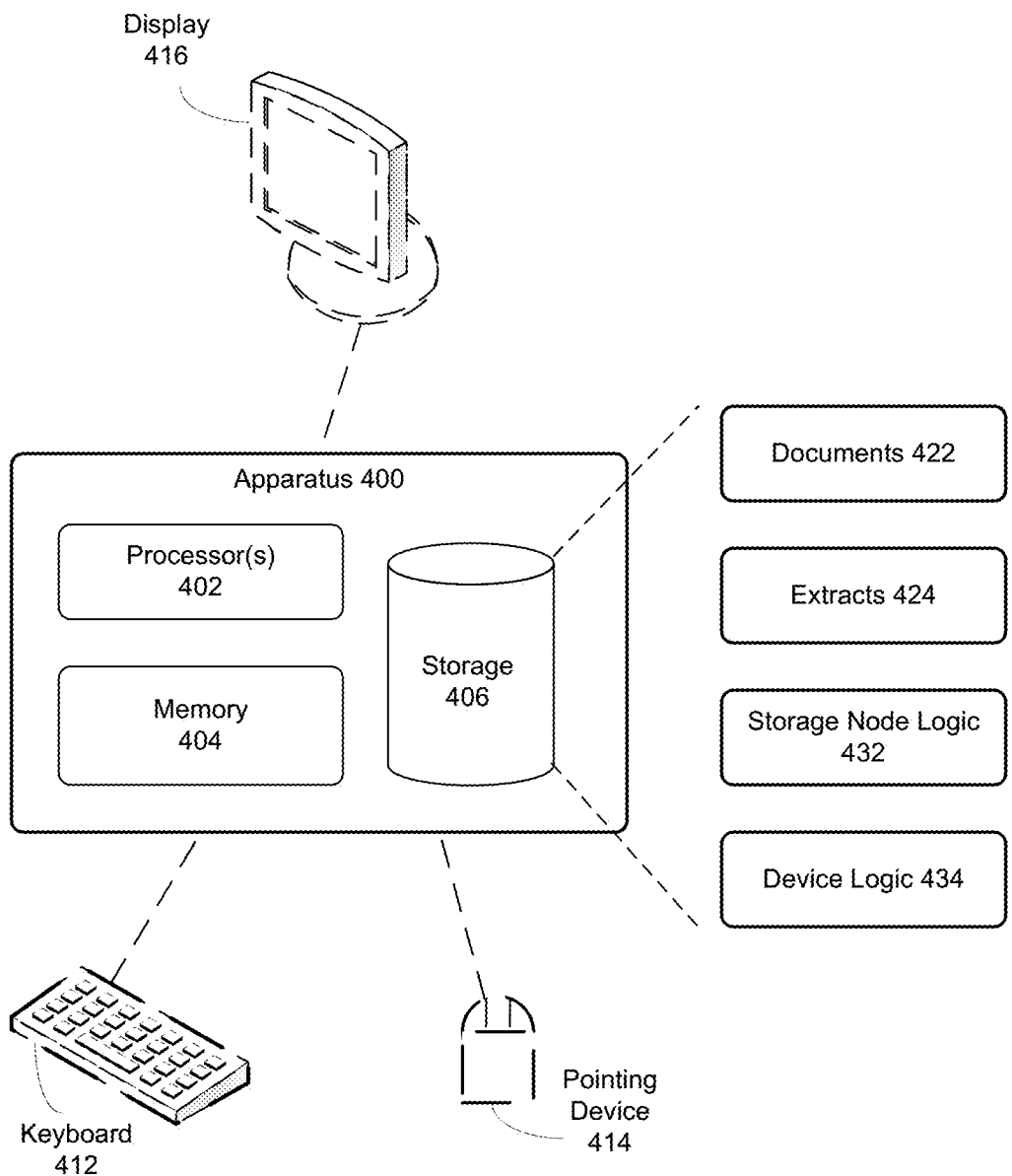
FIG. 4 depicts an apparatus for limiting or preventing write amplification, in accordance with some embodiments.

FIG. 4 depicts an apparatus for limiting or preventing write amplification, according to some embodiments.

Apparatus 400 of FIG. 4 includes processor(s) 402, memory 404, and storage 406, which may comprise any number of solid-state, magnetic, optical, and/or other types of storage components or devices. Storage 406 may be local to or remote from the apparatus. Apparatus 400 can be coupled (permanently or temporarily) to keyboard 412, pointing device 414, and display 416.

Storage 406 stores documents 422 and document extracts 424. Documents 422 are blobs and/or other structures that generally are written as entire entities. In particular, internal components of a particular document generally are not directly addressable. Extracts 424 store portions of documents 422 that have been deemed "hot"—i.e., that have been and/or are expected to be updated with relatively high frequency. Illustratively, each extract corresponds to one document and stores the hottest fields of that document.

Some documents may have no associated extracts, while others may have multiple extracts. In the latter case, different extracts for a given document may store fields/portions of the document that have different frequencies of access or may result when multiple extract structures (e.g., of fixed size) are needed to store all hot fields of the document.

Storage 406 also stores logic and/or logic modules that may be loaded into memory 404 for execution by processor(s) 402, including storage node logic 432 and device logic 434. In other embodiments, these logic modules may be aggregated or further divided to combine or separate functionality as desired or as appropriate.

Storage node logic 432 comprises processor-executable instructions for receiving and storing documents, extracting hot fields of a new or updated document, storing hot fields in extract structures associated with their corresponding documents, retrieving and merging a document and its associated extract structure(s), and responding to document requests. The storage node logic may also be configured to identify hot fields of a particular document (and/or of a particular type or format of document). Other logic (e.g., application logic executing on apparatus 400 or some other machine) may identify hot fields in addition to or in place of storage node logic 432.

Device logic 434 comprises processor-executable instructions for accessing storage devices of apparatus 400, such as storage 406, to write and read entire stored structures (e.g., documents, extracts). As already discussed, when the device logic reads or writs a document 422 or an extract 424, it may read or write the entire structure and may be unable to directly access a particular portion of either structure.

An environment in which one or more embodiments described above are executed may incorporate a data center, a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method of storing data, the method comprising:
storing a first version of a document in a first structure on a storage device;
receiving an updated version of the document;
identifying one or more frequently updated portions of the document;
storing on the storage device the one or more frequently updated portions of the document, in a second structure separate from the first structure;
receiving a request for the document;
retrieving the first version of the document from the first structure and the frequently updated portions of the document from the second structure;
merging the updated portions with the first version to obtain a merged version of the document, by writing the updated portions to the first version of the document; and
returning the merged version of the document in response to the request.

2. The method of claim 1, wherein storing the frequently updated portions of the documents comprises:
extracting the frequently updated portions from the updated version of the document; and
storing the frequently updated portions in the second structure and not in the first structure;
wherein no other portion of the updated document is stored; and
wherein a controller for accessing the storage device cannot write to or read from the storage device only a portion of the first structure or the second structure.

3. The method of claim 1, wherein said identifying comprises:
analyzing updates to multiple documents of a common type, wherein the document is also of the common type; and
identifying at least one portion of the common document type updated more frequently than other portions of the common document type;
wherein the one or more frequently updated portions of the document include the at least one portion of the common document type.

4. The method of claim 1, wherein said identifying comprises:
observing updates to the document over a period of time; and
during said observing, recognizing at least one portion of the document as being accessed more frequently than other portions of the document;
wherein the one or more frequently updated portions of the document include the at least one portion.

5. The method of claim 1, wherein storing the first version of the document comprises:
storing the document as a blob.

6. The method of claim 1, wherein the second structure is stored proximate to the first structure.

7. The method of claim 1, wherein the second structure is stored adjacent to the first structure.

8. The method of claim 1, wherein the one or more frequently updated portions of the document are identified based on different criteria, wherein at least one criterion includes a ratio of a size of the frequently updated portion to a size of the document.

9. An apparatus for storing data, the apparatus comprising:
   a storage device;
   one or more processors; and
   memory storing instructions that, when executed by the one or more processors, cause the apparatus to:
   store a first version of a document in a first structure on the storage device;
   receive an updated version of the document;
   identify one or more frequently updated portions of the document;
   store on the storage device the one or more frequently updated portions of the document, in a second structure separate from the first structure;
   receive a request for the document;
   retrieve the first version of the document from the first structure and the frequently updated portions of the document from the second structure;
   merge the updated portions with the first version to obtain a merged version of the document, by writing the updated portions to the first version of the document; and
   return the merged version of the document in response to the request.

10. The apparatus of claim 9, wherein storing the frequently updated portions of the documents comprises:
   extracting the frequently updated portions from the updated version of the document; and
   storing the frequently updated portions in the second structure and not in the first structure;
   wherein no other portion of the updated document is stored; and
   wherein a controller for accessing the storage device cannot write to or read from the storage device only a portion of the first structure or the second structure.

11. The apparatus of claim 9, wherein said identifying comprises:
   analyzing updates to multiple documents of a common type, wherein the document is also of the common type; and
   identifying at least one portion of the common document type updated more frequently than other portions of the common document type;
   wherein the one or more frequently updated portions of the document include the at least one portion of the common document type.

12. The apparatus of claim 9, wherein said identifying comprises:
   observing updates to the document over a period of time; and
   during said observing, recognizing at least one portion of the document as being accessed more frequently than other portions of the document;
   wherein the one or more frequently updated portions of the document include the at least one portion.

13. The apparatus of claim 9, wherein storing the first version of the document comprises:
   storing the document as a blob.

14. The apparatus of claim 9, wherein the second structure is stored proximate to the first structure.

15. The apparatus of claim 9, wherein the second structure is stored adjacent to the first structure.

16. The apparatus of claim 9, wherein the one or more frequently updated portions of the document are identified based on different criteria, wherein at least one criterion includes a ratio of a size of the frequently updated portion to a size of the document.

17. A system for storing data, the system comprising:
   one or more storage devices;
   at least one processor; and
   a storage module comprising a non-transitory computer-readable medium storing instructions that, when executed, cause the system to:
   store a first version of a document in a first structure on a first storage device;
   receive an updated version of the document;
   identify one or more frequently updated portions of the document;
   store on the first storage device the one or more frequently updated portions of the document, in a second structure separate from the first structure;
   receive a request for the document;
   retrieve the first version of the document from the first structure and the frequently updated portions of the document from the second structure;
   merge the updated portions with the first version to obtain a merged version of the document, by writing the updated portions to the first version of the document; and
   return the merged version of the document in response to the request.

18. The system of claim 17, wherein storing the frequently updated portions of the documents comprises:
   extracting the frequently updated portions from the updated version of the document; and
   storing the frequently updated portions in the second structure and not in the first structure;
   wherein no other portion of the updated document is stored; and
   wherein a controller for accessing the storage device cannot write to or read from the storage device only a portion of the first structure or the second structure.

19. The system of claim 17, wherein:
   the first version of the document is a blob; and
   the second structure is stored proximate to the first structure.

20. The system of claim 17, wherein the one or more frequently updated portions of the document are identified based on criteria, wherein at least one criterion includes a ratio of a size of the frequently updated portion to a size of the document.

* * * * *